Oct. 26, 1971 C. M. BREINER 3,614,969
TIRE RECAPPING RIM
Filed March 7, 1969 2 Sheets-Sheet 1
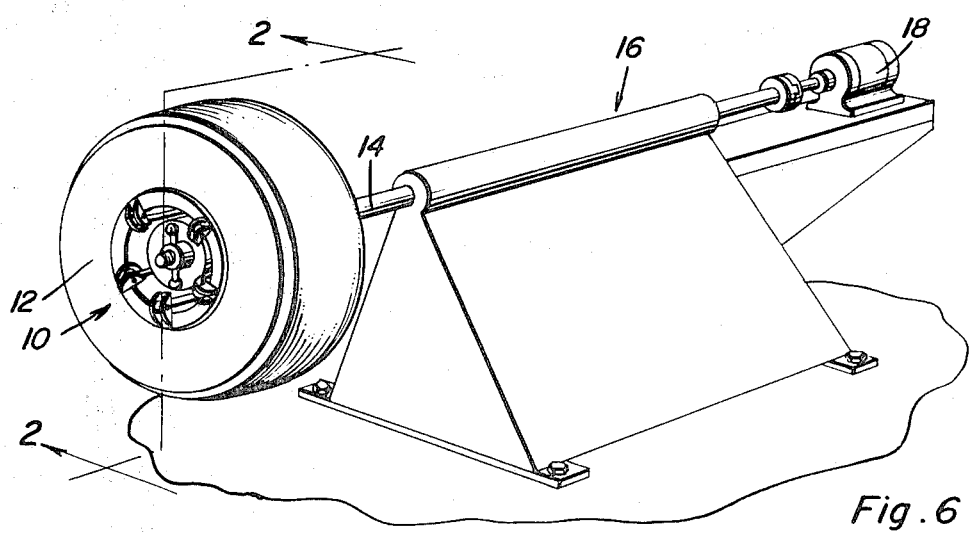
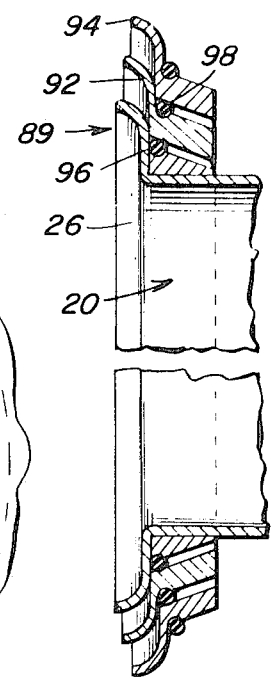
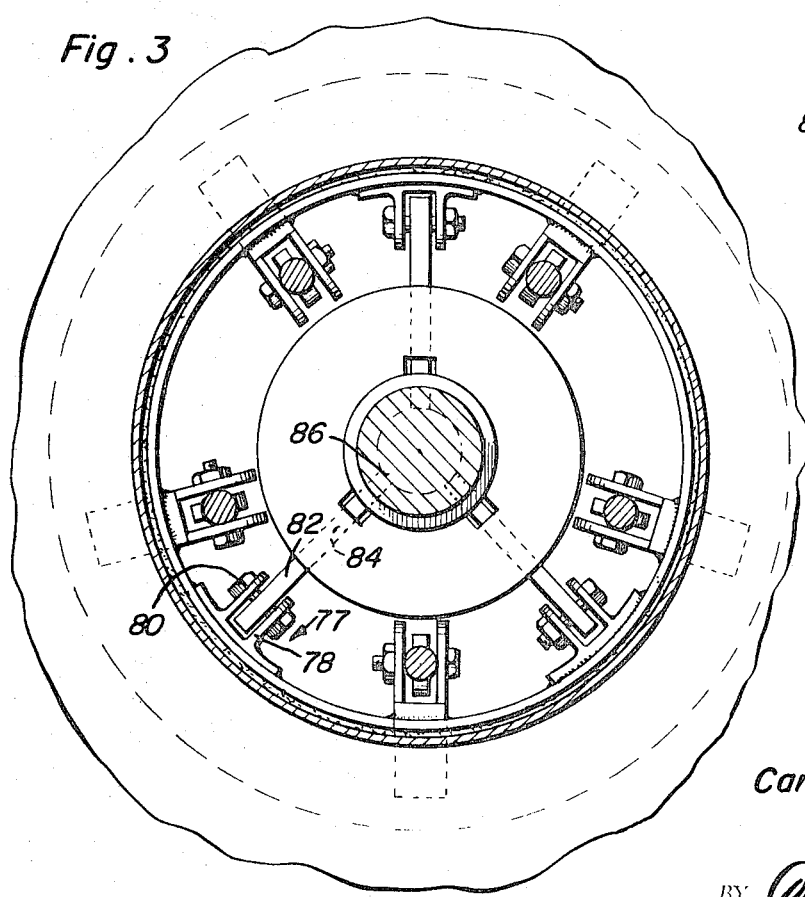
Carl M. Breiner
INVENTOR
BY *Clarence A. O'Brien*
and *Harvey B. Jacobson*
Attorneys

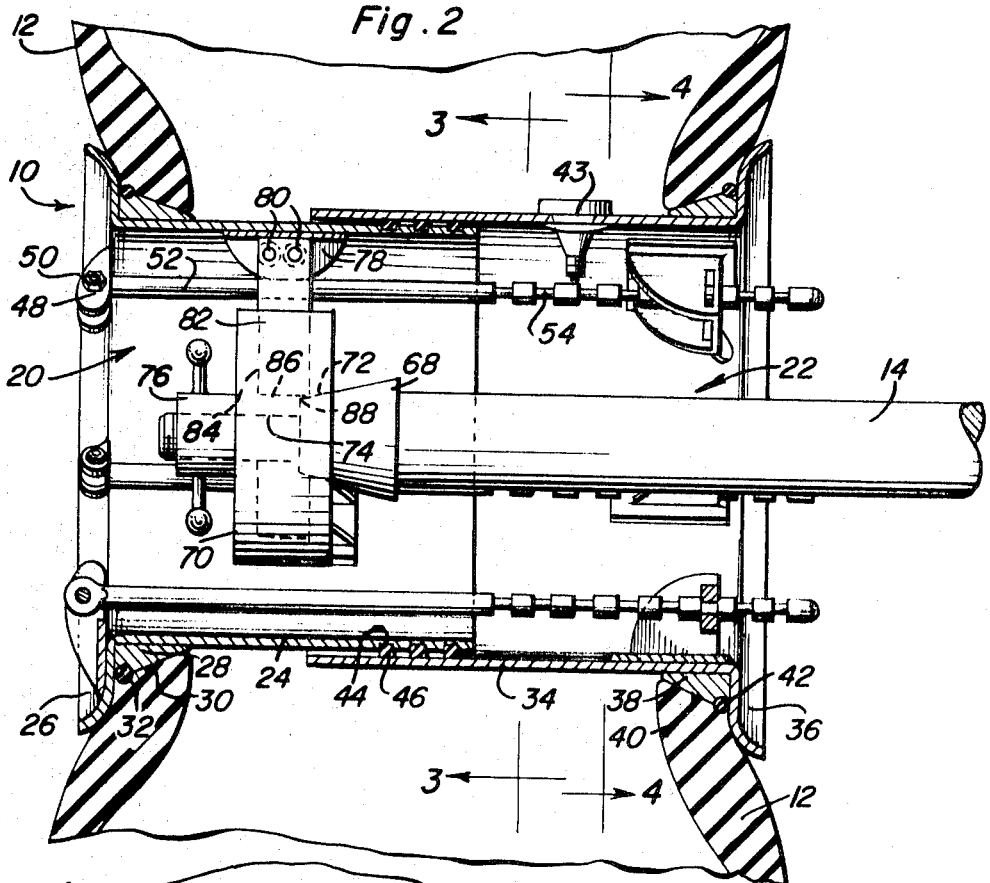
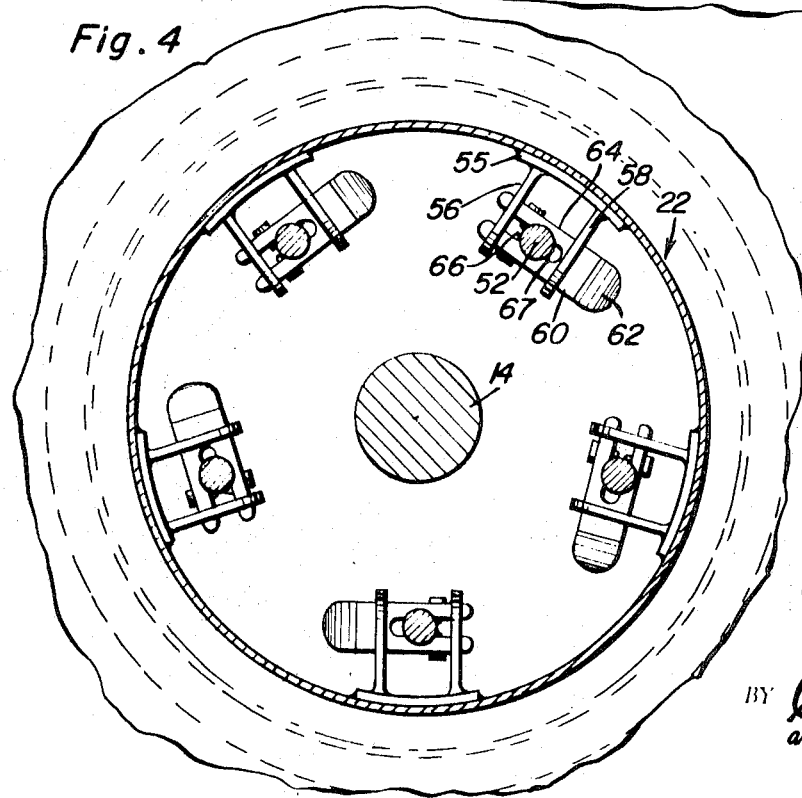
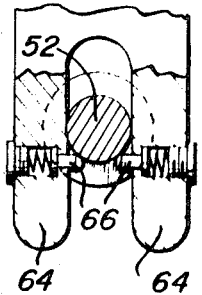

United States Patent Office 3,614,969
Patented Oct. 26, 1971

3,614,969
TIRE RECAPPING RIM
Carl M. Breiner, 4101 S. 2nd St., Yakima, Wash. 98903
Filed Mar. 7, 1969, Ser. No. 805,327
Int. Cl. B29h 5/02
U.S. Cl. 144—288                                    4 Claims

ABSTRACT OF THE DISCLOSURE

A rim assembly having two cylindrical rim sections retained in telescoping relation for mounting a tire in preparation of multiple recapping operations. The two rim sections are removably held together by means of a plurality of notched rods, each rod being secured at one end thereof to one rim section, the opposite ends thereof passing into the second rim section. Because the second ends of the rods are notches, they are engaged by detent means attached to the second rim section. When engagement of the rods and the detents is effected, the rim device may be mounted to a rotating shaft for multiple recapping operations. Means are provided for rapidly installing and removing a tire mounted rim assembly to a rotating shaft.

---

The present invention relates to tire recapping devices.

In the past, recapping machinery has been provided which requires the mounting and dismounting of a tire during successive recapping operations. In certain devices where a single mounting rim allows retention of a tire at a single station during multiple recapping operations, it has been necessary to provide a large number of differently sized rims to accommodate tires of various dimensions.

The present invention presents a universal tire recapping rim which is adjustable to accommodate a wide variation of tire sizes. Further, the invention is comprised of two telescoping rim sections which can be adjusted quickly and accurately to mount a tire for recapping. The rim device also includes means for securely centering the tire mounted rim to a rotating shaft so that a substantially round tire may be produced while multiple operations are sequentially performed upon the tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a tire mounting rim which is in turn secured to a rotating shaft for permitting multiple recapping operations to be performed without removing the rim.

FIG. 2 is a partial diametrical sectional view taken along a plane passing through section line 2—2 of FIG. 1.

FIG. 3 is a transverse sectional view taken along a plane passing through section line 3—3 of FIG. 2.

FIG. 4 is a transverse sectional view taken along a plane passing through section line 4—4 in FIG. 2.

FIG. 5 is a partial sectional view illustrating detent means for securing first and second rim sections in telescoping relation.

FIG. 6 is a partial sectional view illustrating the mounting of several ring-like shims around the rim device for accommodating a wide variety of tire sizes.

Referring particularly to the drawings and more particularly to FIG. 1 thereof, the present curing rim is generally indicated by reference numeral 10 and is seen to mount a tire 12 thereon, the tire being destined for recapping. The rim is axially secured to an elongated rotating shaft 14 which is driven by a motor 18. The rotating shaft and motor may be of the form conventionally found in delugger machinery 16, and does not per se form the present invention.

Referring to FIG. 2, the rim device will be seen to principally consist of a first cylindrical rim section 20 contained in telescoping relation with a second cylindrical rim section 22. Considering the first mentioned rim section 20, this section includes a cylindrical wall 24 appending outwardly to an annular flange 26. The annular end between the cylindrical wall 24 and the flange 26 contacts a peripherally disposed ring-like wedge 28 for supporting the radially inward bead surface 30 of a tire 12. An O-ring 32 positioned between the peripheral ring 28 and the tire 12 provides an air seal therebetween so that an inflated mounted tire may retain pressure.

The second rim section 22 includes a cylindrical wall 34 disposed in outward contacting relation with respect to the cylindrical wall 24. The outward end of rim section 22 extends to an integrally formed annular flange 36, identical to the aforementioned flange 26. Also, a wedge-shaped peripheral ring 38, substantially similar to the peripheral ring 28, is positioned between the cylindrical wall 34 and the annular flange 36. An O-ring 42 is inserted between the peripheral ring 38 and the bead surface 40 of tire 12. As will be noted in FIG. 2, the bead surface 40 is axially disposed in opposing relation to the aforementioned bead surface 30. A stem valve 43 is received within the cylindrical wall 34 so that tire 12 may be inflated when installed on the rim. As will be noted from FIG. 2, the valve is positioned so that an air hose is connected to the valve from the interior of the tire rim. A plurality of axially spaced O-rings 46 are received within recesses 44 formed in cylindrical wall 24 of rim section 20. The outward portion of the O-rings contact the interior surface of wall 34 to effect a seal between rim sections 20 and 22 thereby preventing air escape from the inflated tire 12.

In order to retain the rim sections 20 and 22 together, five U-shaped brackets 48 are attached to the outwardly confronting surface of the annular flange 26. The brackets 48 act as clevises for a pivotally mounted elongated rod 52 which is connected to the clevis by means of a pin 50. The rods extend in parallel spaced relation to the axis of the rim so that the free end of the rods pass through the second section. As will be noted from FIG. 2, each free end portion includes spaced notches 54 therein for purposes to be presently described.

A number of U-shaped brackets 55 are peripherally spaced around the interior wall surface of the second rim section 22. The brackets 55 are positioned in axial alignment with respective clevises 48. As will be seen from FIG. 4, the U-shaped bracket 55 extends radially inwardly of the rim section 22 and includes two oppositely disposed arms 56 and 58. These arms include apertures therein to permit transverse passage of a bifurcated clip 60 therethrough. The bifurcated clip includes a tabular end 62 for allowing manual manipulation of the clip. The bifurcated end portion of the clip is clearly shown in FIG. 5 to have arm elements 64 which are thick enough to permit enclosure of a spring biased detent projection 66 within each arm element. As shown in FIG. 5, when the rim sections are properly aligned and placed together to mount the tire, the notches 54 in transverse alignment with respective clips 60 form detent means for preventing separation of the first and second rim sections.

As will be noted from FIG. 4, during rotation of shaft 14, the rods 52 are restrained from movement in a radial direction due to the arm elements 64. The bight portion 67 of the clip 60 on one side of rod 52 and the detent projections on the other side inhibit motion of rod 52 in a tangential direction.

Referring again to FIG. 2, the load end of shaft 14 is seen to terminate in a frusto-conical or outwardly tapering projection 68. An annular collar 70 having an inwardly extending tapered recess 72 seats the frusto-conical projection 68. An elongated threaded bar section 74 extends outwardly from the tapered projection 68 in an axial direction. A turn wheel 76 is threadably engaged with the threaded bar extension 74 and permits clamping of collar 70 against the tapered projection 68 when the turn wheel is tightened.

In order to translate rotational motion from the shaft 14 to the tire rim, three equally spaced and radially extending lugs 82 have their radially inward ends 86 recessed within radial slots 84 formed in collar 70. The opposite ends of the lugs are connected to bracket assemblies generally indicated by 77 which include a U-shaped bracket 78 connected to the annular flange 26 in the same manner as the previously mentioned clevises 48. As will be shown in FIG. 2, the lugs 82 are secured to the bracket 78 by means of two connecting bolts 80. Accordingly, the lugs 82 perform a mechanical keying function so that rotational motion of shaft 14 may be imparted to the tire rim. Further, the lugs permit proper centering of the tire rim on the shaft 14. The latter function being achieved when the radially inward end 86 of each lug contacts the frusto-conical surface of the projection 68, as indicated by 88.

In order to permit the present rim to be used as a universal mount, over a broad range of tire sizes, adapter rings or shims indicated by reference 89 in FIG. 6 can be used. In effect, the adapter rings include annular flanges of increasing diameter which are positioned in concentric relation to the flange portion 26 of rim section 20. Of course as will be appreciated, a similar disposition of adapter rings occurs around the oppositely disposed flange 36 associated with rim section 22. For purposes of illustration, FIG. 6 illustrates the use of two adapter rings 92 and 94 that are separated from one another by an O-ring 98. A similar O-ring 96 is positioned between the first rim section 20 and the ring adapter 92.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A telescoping tire rim device comprising first and second cylindrical rim sections, means for sealing the annular space between the rim sections, the outward end of the rim sections having annular flanges, a plurality of rod members connected at first ends thereof to the annular flange of one rim section, the rod members extending into the second rim section, in axial spaced relation to the axis of the telescoping rim sections, the rod members having notches formed therein, and detent means mounted to the interior wall of the second rim section for engaging the notches in the rod members to secure the annular flanges at a preselected axial distance from one another, and valve means received in one rim section for inflating and deflating a tire mounted on the rim device, the rim device having means for mounting on a rotating shaft, said mounting means including means connected to one of the rim device sectios for centering the rim with respect to the shaft.

2. A tire recapping assembly including a motor driven shaft, a hub connected to the shaft load end, a telescoping tire rim device mounted to the hub, the device comprising first and second cylindrical rim sections, means for sealing the annular space between the rim sections, the outward end of the rim sections having annular flanges, a plurality of rod members connected at first ends thereof to the annular flange of one rim section, the rod members extending into the second rim section in axial spaced relation to the axis of the telescoping rim sections, the rod members having notches formed therein, and detent means mounted to the interior wall of the second rim section for engaging the notches in the rod members to secure the annular flanges at a preselected axial distance from one another, and valve means received in one rim section for inflating and deflating a tire mounted on the rim device, means for centering the rim device on the hub, the means including a plurality of guide plates connected to one rim section and extending radially inwardly for contacting the hub, and means for securing the centered rim device on the hub.

3. The device set forth in claim 2 wherein the hub includes an outwardly tapering projection integrally attached to the load end of the shaft, a collar having a central tapered recess for axially engaging the tapered projection, the collar further including radial recesses for receiving the guide plates therein, and locking means for securing the collar against the projection.

4. The device set forth in claim 2 wherein the detent means includes a U-shaped clip having parallel disposed arms for engaging the notches, and spring biased detent projections in the arms and extending toward each other for restraining the notches in the clip thereby preventing separation of the first and second rim sections.

References Cited

UNITED STATES PATENTS

| | | | |
|---|---|---|---|
| 2,077,506 | 4/1937 | Woock | 18—18 |
| 3,133,317 | 5/1964 | Branick | 18—45 |
| 3,238,982 | 3/1966 | Darr | 144—288.1 |
| 3,300,814 | 1/1967 | Sornsen | 18—18 |

DONALD R. SCHRAN, Primary Examiner

U.S. Cl. X.R.

157—13; 18—18 F, 45 R